United States Patent [19]

Myers

[11] Patent Number: 6,070,453

[45] Date of Patent: Jun. 6, 2000

[54] COMPUTERIZED DISPENSER TESTER

[75] Inventor: William J. Myers, Fort Wayne, Ind.

[73] Assignee: Tokheim Corporation, Fort Wayne, Ind.

[21] Appl. No.: 09/133,512

[22] Filed: Aug. 12, 1998

[51] Int. Cl.[7] .............................. G01M 3/08; G01M 3/04
[52] U.S. Cl. ........................................ 73/40.5 R; 73/45.4
[58] Field of Search ................................ 73/40.5 R, 49.2, 73/45.4, 40

[56] References Cited

U.S. PATENT DOCUMENTS

| | | |
|---|---|---|
| 3,872,712 | 3/1975 | Westervelt et al. ........................... 73/40 |
| 5,065,350 | 11/1991 | Fedder . |
| 5,072,621 | 12/1991 | Hasselmann . |
| 5,086,403 | 2/1992 | Slocum et al. . |
| 5,090,234 | 2/1992 | Maresca, Jr. et al. . |
| 5,201,212 | 4/1993 | Williams . |
| 5,295,391 | 3/1994 | Mastandrea et al. ..................... 73/49.2 |
| 5,317,899 | 6/1994 | Hutchinson et al. . |
| 5,325,706 | 7/1994 | Grose . |
| 5,333,115 | 7/1994 | Clouser et al. . |
| 5,363,689 | 11/1994 | Hoffmann et al. ......................... 73/1.17 |
| 5,372,032 | 12/1994 | Filippi et al. . |
| 5,384,714 | 1/1995 | Kidd . |
| 5,450,834 | 9/1995 | Yamanaka et al. ......................... 73/40 |
| 5,471,867 | 12/1995 | Tuma et al. . |
| 5,557,965 | 9/1996 | Fiechtner . |
| 5,650,943 | 7/1997 | Powell et al. . |

*Primary Examiner*—Hezron Williams
*Assistant Examiner*—Jay L. Politzer
*Attorney, Agent, or Firm*—Randall J. Knuth

[57] ABSTRACT

A method and system for detecting leaks in a fuel dispenser is operative to pneumatically pressurize a selectable one of a vapor recovery portion and a fuel dispensing portion using a compressed air flow. A flowmeter measures the flow rate of the compressed air communicated to the fuel dispenser for pressurization thereof. A processor provides an indication of the leakage condition of the fuel dispenser based upon the pneumatic flow rate measured by the flowmeter which satisfies a pressurization condition for the fuel dispenser, such as maintaining the pressurization level above a threshold value. The flow rate of compressed air needed to maintain this pressurization level is indicative of the leak rate.

23 Claims, 5 Drawing Sheets

COMPUTERIZED DISPENSER TESTER

BACKGROUND OF THE INVENTION

1. Field of the Invention

The present invention relates generally to fuel dispensing equipment located at vehicle refueling stations, and, more specifically, to a leak detection system using compressed air to selectively pressurize the vapor recovery portion and fuel dispensing portion of a fuel dispenser to evaluate the equipment for leakage problems.

2. Description of the Related Art

Refueling stations employ a fuel dispenser typically provided in the form of a nozzle-based assembly having a flexible fluid-conveying hose with a discharge nozzle at one end that the operator manually activates to control the dispensing of fuel. Integrated with the fuel dispenser is a vapor recovery system that typically uses a vacuum-assist pump apparatus to facilitate the collection of vapor effluents that are displaced from the vehicle tank reservoir as liquid fuel is introduced into the tank. It is clear in terms of human safety and environmental protection that both the vapor recovery and fuel dispensing portions remain structurally intact to protect against unwanted fluid loss or vapor release into the atmosphere arising from material or structural failures in the equipment. The need to sustain a proper level of equipment integrity extends not only to components such as seals that function specifically to provide a closed system with respect to the fuel and vapor pathways, but extends as well to every other component that interacts with or assists in the communication of liquid fuel and recovered vapors. A need therefore exists to provide a diagnostic apparatus that examines the fuel dispensing equipment and enables the testing operator to determine the origin and extent of any weakness in the equipment that would allow either fuel or vapor to escape.

One conventional approach to identifying leakage problems involves measuring the flow rate of the liquid fuel supplied by the fuel pump needed to maintain the pressurization of the fuel line within a certain range. The leak test performed in accordance with this approach is conducted during normal operation of the fuel delivery system. Another approach involves isolating a segment of the fuel delivery pipeline and determining whether leakage has occurred by measuring any pressure changes in the liquid fuel contained in the isolated pipeline segment. Yet another conventional leak detector utilizes a test reservoir filled with fuel and which is disposed in fluid communication with the fuel line. Monitoring pressure and temperature changes in the test reservoir provides data indicative of the leak rate of the fuel line.

These conventional apparatus attempt to identify leaks in the fuel delivery system by analyzing the in-line liquid fuel for changes in characteristic parameters such as pressure and temperature. This form of analysis typically requires activation of the fuel delivery system, particularly the fuel pump, so that the fuel line can be pressurized and thereby readied for the diagnostic leak test. Performing a leak detection test on in-service fuel dispensing equipment, however, presents the obvious drawback that fuel is still permitted to escape even though the leak may be successfully detected. Other conventional test apparatus operate on the fuel delivery system when it is inactivated, although such apparatus are still characterized by the need to pressurize the fuel line under investigation through simulation or by utilizing a test reservoir. What is therefore needed is a diagnostic method and apparatus that allows the fuel delivery system to be probed for leaks during an inactivation period and that does not require the fuel line to be pressurized with fuel in order for the leak test to be conducted.

SUMMARY OF THE INVENTION

According to the present invention there is provided a system and method for detecting leaks in the fuel delivery system associated with a refueling service station. The leak detection system is preferably provided in the form of test equipment including a means for pneumatically pressurizing a selectable one of a vapor recovery portion and a fuel dispensing portion of the fuel delivery system. For this purpose there is provided a fluid source that controllably generates a pressurized fluid flow preferably comprised of pressurized air. A coupling arrangement preferably provided in the form of a valve assembly disposes the pressurized fluid source in fluid communication with the fuel delivery system. A measurement means provided in the form of a flowmeter measures the flow rate of the compressed air generated by the fluid source and communicated to the fuel delivery system for pressurization thereof. A controller is provided to control the pressurization activity of the test equipment. An analysis means provides an indication of the leakage condition of the fuel dispensing system based upon the pneumatic flow rate measured by the flowmeter which satisfies a pressurization condition for the fuel dispenser. This pressurization condition, in one form thereof, involves maintaining the pressurization level of the selected fuel dispenser portion above a threshold value. The flow rate of compressed air needed to maintain this pressurization level is indicative of the leak rate.

The invention, in one form thereof, comprises a leak detection system for use with a fuel dispenser. The leak detection system includes a pressurization means for pneumatically pressurizing at least a portion of the fuel dispenser; a control means for controlling the pneumatic pressurization activity of the pressurization means; a measurement means for measuring the pneumatic flow rate associated with the pressurization means; and a processor means for providing an indication of the leakage condition of the at least a portion of the fuel dispenser based upon the pneumatic flow rate measured by the measurement means which satisfies a pressurization condition for the fuel dispenser.

The pressurization means, in one form thereof, is operable to controllably pneumatically pressurize at least one of a vapor recovery portion and a liquid fuel dispensing portion of the fuel dispenser. The pressurization means, in another form thereof, further comprises a fluid source means, disposed in operative fluid communication with the at least a portion of the fuel dispenser, for controllably generating a pressurized fluid flow. The control means, in one form thereof, further includes a pressure sensor adjustably arranged in pneumatic pressure-detecting relationship with the at least a portion of the fuel dispenser; and a means for generating a control signal representative of the pneumatic pressure detected by the pressure sensor and providing the control signal to the fluid source means to effect control thereof. The pressurization means further includes a controllable valve assembly arranged with the fluid source means and responsive to valve control signals supplied by the control means to controllably regulate the flow of pressurized fluid generated by the fluid source means and communicated to the at least a portion of the fuel dispenser. The measurement means, in one form thereof, further includes a fluid flow sensor adjustably arranged in flow rate-detecting relationship with the pressurized fluid generated by the fluid source means; and a means for generating a control signal representative of the fluid flow rate detected by the fluid flow sensor and providing the control signal to the processor means.

The pressurization condition for the fuel dispenser associated with the functional activity of the processor means involves, at least in part, maintaining the pressurization level of the at least a portion of the fuel dispenser above a threshold value.

The invention, in another form thereof, includes a leak detection system for use with a fuel dispenser, such leak detection system comprising: a fluid source controllably providing a pressurized fluid flow and operatively arranged for fluid communication with at least a portion of the fuel dispenser to enable the pressurization thereof; a control means, operatively coupled to the fluid source, for controlling the pressurization of the at least a portion of the fuel dispenser; a first means for determining the flow rate of the pressurized fluid flow provided by the fluid source; and a processor means for providing an indication of the leakage condition of the at least a portion of the fuel dispenser based upon the flow rate determined by the first means which satisfies a pressurization condition for the fuel dispenser.

The fluid source, in one form thereof, is operable to controllably pneumatically pressurize at least one of a vapor recovery portion and a liquid dispensing portion of the fuel dispenser. The pressurization condition for the fuel dispenser associated with the functional activity of the processor means involves, at least in part, maintaining the pressurization level of the at least a portion of the fuel dispenser above a threshold value.

The leak detection system further includes a valve means, arranged for control by the control means, for operatively regulating the flow of pressurized fluid from the fluid source to a selected one of the vapor recovery portion and the liquid dispensing portion of the fuel dispenser. The control means further comprises a microprocessor. The invention, in another form thereof, comprises a system for use with a fuel dispenser. The system includes a pressurization means for controllably pressurizing at least a portion of the fuel dispenser using a pressurized pneumatic fluid flow; a control means for controlling the pressurization activity of the pressurization means; and a means for determining the leakage rate of the at least a portion of the fuel dispenser by measuring the flow rate of the pressurized pneumatic fluid flow which satisfies a pressurization condition for the fuel dispenser. The pressurization condition involves, at least in part, maintaining the pressurization level of the at least a portion of the fuel dispenser above a threshold value.

The pressurization means, in one form thereof, further comprises a means, including a controllable valve assembly, for selectively operatively communicating the pressurized pneumatic fluid flow provided by the pressurization means to at least one of a vapor recovery portion and a liquid dispensing portion of the fuel dispenser. The leakage rate determining means further comprises a sensor arranged to detect the flow rate of the pressurized pneumatic fluid flow provided by the pressurization means and communicated to the at least a portion of the fuel dispenser; and a processor to provide an indication of the leakage rate of the at least a portion of the fuel dispenser based upon the measured flow rate associated with the satisfaction of the pressurization condition.

The invention, in another form thereof, includes an assembly operatively associated with a fuel dispenser. The assembly comprises: a fluid source controllably providing a pressurized pneumatic fluid flow; a coupling assembly, including a controllable valve assembly, arranged to enable fluid communication between the fluid source and at least a portion of the fuel dispenser; a sensor arranged to detect the flow rate of pressurized fluid provided by the fluid source; a controller, arranged for operative control of the fluid source and the valve assembly, to control the pressurization of the at least a portion of the fuel dispenser; and a processor to determine a leakage condition of the at least a portion of the fuel dispenser based upon the detected flow rate of pressurized fluid which satisfies a pressurization condition for the fuel dispenser. The pressurization condition for the fuel dispenser involves, at least in part, maintaining the pressurization level of the at least a portion of the fuel dispenser above a threshold value.

The coupling assembly is operatively arranged to permit the pressurized fluid flow provided by the fluid source to selectively communicate with at least one of a vapor recovery portion and a liquid dispensing portion of the fuel dispenser. The invention, in yet another form thereof, includes a leak detection system for use with a plurality of fuel dispensers. The leak detection system comprises: a pressurization means for controllably selectively pressurizing at least one of the plurality of fuel dispensers using a pressurized fluid flow; a control means for controlling the pressurization activity of the pressurization means; a measurement means for measuring the flow rate of the pressurized fluid flow provided by the pressurization means; and a processor means for providing an indication of the leakage condition of the at least one of the plurality of fuel dispensers subject to pressurization based upon the flow rate measured by the measurement means which satisfies a pressurization condition for the at least one fuel dispenser. The pressurization condition for the at least one fuel dispenser involves, at least in part, maintaining the pressurization level of the at least one fuel dispenser above a threshold value.

The pressurization means, in one form thereof, further comprises a fluid source controllably providing a pressurized fluid flow; and a coupling means, arranged for control by the control means and including a controllable valve assembly, for operatively establishing fluid communication between the fluid source and the at least one of the plurality of fuel dispensers. The coupling means is operable to permit the pressurized fluid flow provided by the fluid source to communicate with at least one of a vapor recovery portion and a liquid dispensing portion of the at least one of the plurality of fuel dispensers.

The invention, in yet another form thereof, comprises a leak detection method for use with a fuel dispenser. The method comprises the steps of: pneumatically pressurizing a selectable one of a vapor recovery portion and a fuel dispensing portion of the fuel dispenser; controlling the pneumatic pressurization of the selectable one of the vapor recovery portion and the fuel dispensing portion of the fuel dispenser in accordance with leak test criteria; measuring the flow rate of the pneumatic fluid flow associated with the pneumatic pressurization activity; and providing an indication of the leakage condition of the selectable one of the vapor recovery portion and the fuel dispensing portion of the fuel dispenser based upon the measured pneumatic fluid flow rate which satisfies a pressurization condition for the fuel dispenser. The pressurization condition for the fuel dispenser associated with the step of providing an indication of the leak condition thereof involves, at least in part, maintaining the pressurization level of the selectable one of the vapor recovery portion and the fuel dispensing portion above a threshold value.

The invention, in still yet another form thereof, includes a leak detection method for use with a fuel dispenser. Such method comprises the steps of: providing a fluid source controllably supplying a pressurized pneumatic fluid flow; disposing the fluid source in an arrangement enabling operative fluid communication between the fluid source and a selectable one of a vapor recovery portion and a fuel dispensing portion of the fuel dispenser to permit controllable pressurization thereof; providing a sensor to detect the flow rate of pressurized pneumatic fluid supplied by the fluid source; providing a controller to control the pressurization of the selectable one of the vapor recovery portion and the fuel dispensing portion of the fuel dispenser; and providing an indication of the leakage condition of the selectable one of the vapor recovery portion and the fuel dispensing portion of the fuel dispenser based upon the flow rate detected by the sensor which satisfies a pressurization condition for the fuel dispenser. The pressurization condition for the fuel dispenser associated with the step of providing an indication of the leak condition thereof involves, at least in part, maintaining the pressurization level of the selectable one of the vapor recovery portion and the fuel dispensing portion above a threshold value.

The step of disposing the fluid source in the fluid communicative arrangement further comprises the steps of: providing a controllable valve assembly arranged to regulate the flow of pressurized pneumatic fluid between the fluid source and the selectable one of the vapor recovery portion and the fuel dispensing portion of the fuel dispenser.

The invention, in still yet another form thereof, includes a leak detection method for use with a plurality of fuel dispensers, such method comprising the steps of: pneumatically pressurizing a selectable one of a vapor recovery portion and a fuel dispensing portion of at least one of the plurality of fuel dispensers; controlling the pneumatic pressurization of the selectable one of the vapor recovery portion and the fuel dispensing portion of the at least one fuel dispenser; measuring the flow rate of the pneumatic fluid flow associated with the pneumatic pressurization activity; and providing an indication of the leakage condition of the selectable one of the vapor recovery portion and the fuel dispensing portion of the at least one fuel dispenser based upon the measured pneumatic fluid flow rate which satisfies a pressurization condition for the fuel dispenser.

One advantage of the present invention is that the diagnostic equipment operates free of any need to pressurize the fuel delivery system with liquid fuel, relying instead upon compressed air as the test medium for pressurizing the system.

Another advantage of the present invention is that the diagnostic equipment is adaptable to selectively test both the vapor recovery portion and the fuel dispensing portion of the fuel delivery system, unlike conventional test apparatus that are limited to diagnosing leaks in only the fuel dispensing line.

Another advantage of the present invention is that the leak detection test is performed without having to activate any part of the fuel delivery system, ensuring that no fuel leakage will occur during the test procedure.

Another advantage of the present invention is that the utilization of compressed air to conduct the leak detection test provides an environmentally safe testing apparatus, thereby avoiding the use of hazardous liquid materials characteristic of conventional systems.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
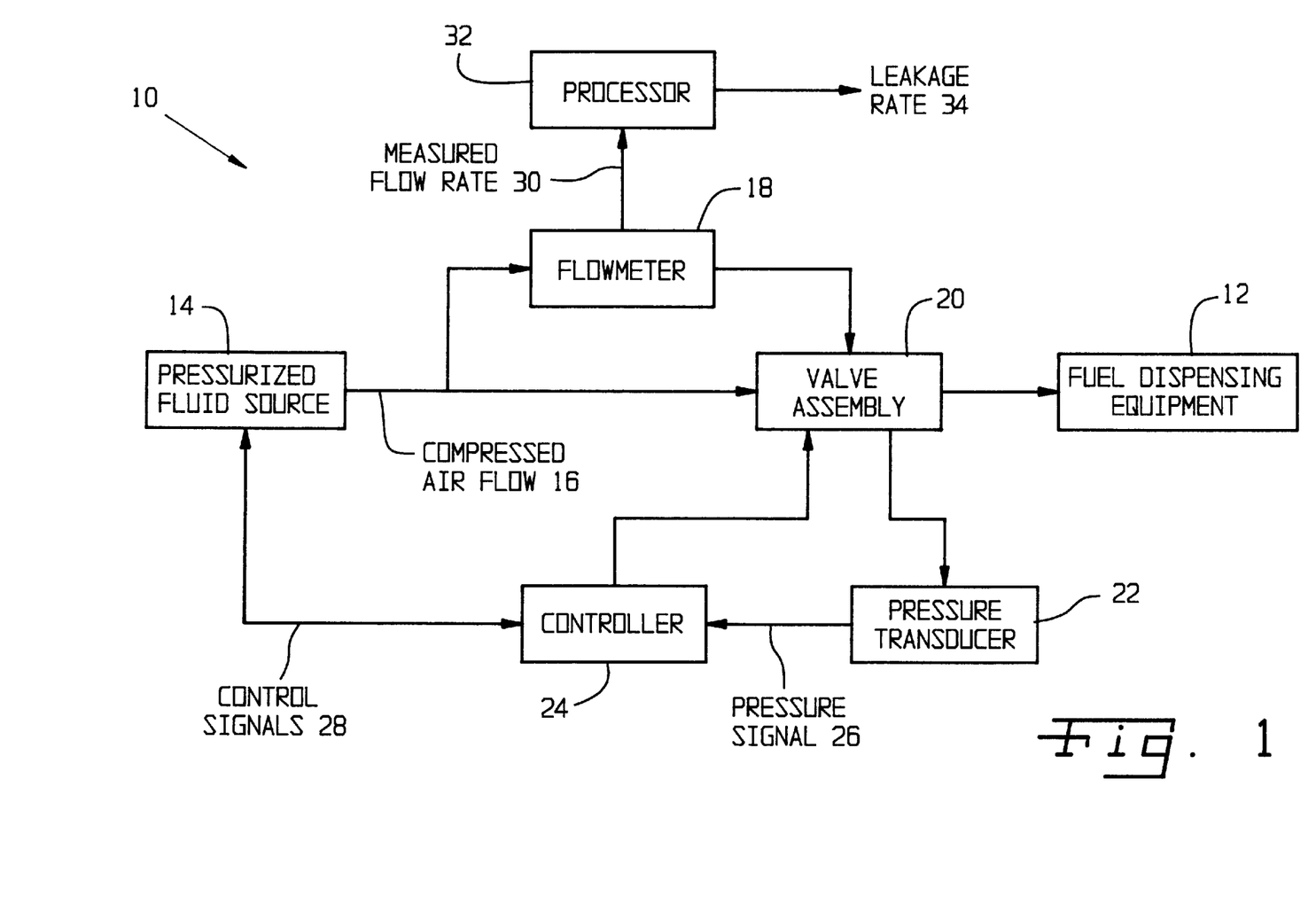
FIG. 1 is a block diagram illustration of a leak detection system for use with fuel dispensing equipment in accordance with one embodiment of the present invention.

Referring to the drawings and particularly to FIG. 1, there is shown in block diagram format a leak detection system 10 for use in performing a leak detection test on fuel dispensing equipment 12 according to one embodiment of the present invention. System 10, in general terms, employs a compressed air flow to pressurize a selectable one of a vapor recovery portion and a liquid fuel dispensing portion of fuel dispensing equipment 12 and measures the flow rate of compressed air needed to maintain a predetermined pressurization condition within the selected dispenser portion, such as a desired pressurization range. This measured flow rate is representative of the leak rate of the selected dispenser portion under investigation. A coupling arrangement preferably comprising a valve assembly is used to controllably connect the source of compressed air to any one of a plurality of fuel dispensers such that each of the plural fuel dispensers can be selectively examined for leakage.

The illustrated leak detection system 10 of FIG. 1 includes a pressurized fluid source 14 generating a compressed air flow 16. A flowmeter 18 provides a measure of the flow rate of compressed air flow 16. A controllable valve assembly 20 regulates the transmission of compressed air flow 16 to fuel dispensing equipment 12, specifically to a selectable one of the vapor recovery portion and fuel dispensing portion thereof. A connection assembly (not shown) of conventional construction is integrated with valve assembly 20 to provide the complete coupling arrangement that enables pressurized fluid source 14 to be disposed in operative fluid communication with fuel dispensing equipment 12. When fuel dispensing equipment 12 incorporates a plurality of individual fuel dispensers, valve assembly 20 enables controllable routing of compressed air flow 16 to a selected one of the fuel dispensers.

The leak detection procedure according to the present invention initially establishes a certain pressurization level within the selected fuel dispenser portion. After the pressurization level is stabilized, the illustrated leak detection system 10 continues, if necessary, to supply the selected fuel dispenser portion with a compressed air flow 16 to ensure that the desired pressurization level is sustained throughout the test period. The flow rate of this repressurizing compressed air flow is indicative of the leakage rate of the selected fuel dispenser portion. A sensor in the form of pressure transducer 22 is provided to monitor the pressure within fuel dispensing equipment 12 and generate a pressure signal representative thereof. Pressure transducer 22 is interfaced to fuel dispensing equipment 12 in a conventional manner. A controller 24 is provided to manage, direct, supervise and otherwise control the entire operation of leak detection system 10, functioning particularly to generate the instructions necessary to execute the leak detection procedure according to the present invention.

Controller 24, in one mode thereof, generates control signals 28 based upon the pressure signal 26 supplied by pressure transducer 22 to effect suitable control of pressurized fluid source 14 to ensure that a sufficient air flow 16 is provided that maintains the air pressure within the selected fuel dispenser portion at the predetermined pressurization level. A processor 32 provides an indication of the leakage rate 34 based upon the flow rate of compressed air 16 needed to maintain the desired pressurization level within fuel dispensing equipment 12. As shown, processor 32 is arranged to receive the measured flow rate 30 from flowmeter 18 to facilitate this determination of leakage rate 34. Controller 24 and processor 32 are preferably arranged as an integral unit provided in the form of a user-interactive microprocessor or other comparable computing arrangement.

Figure 2:
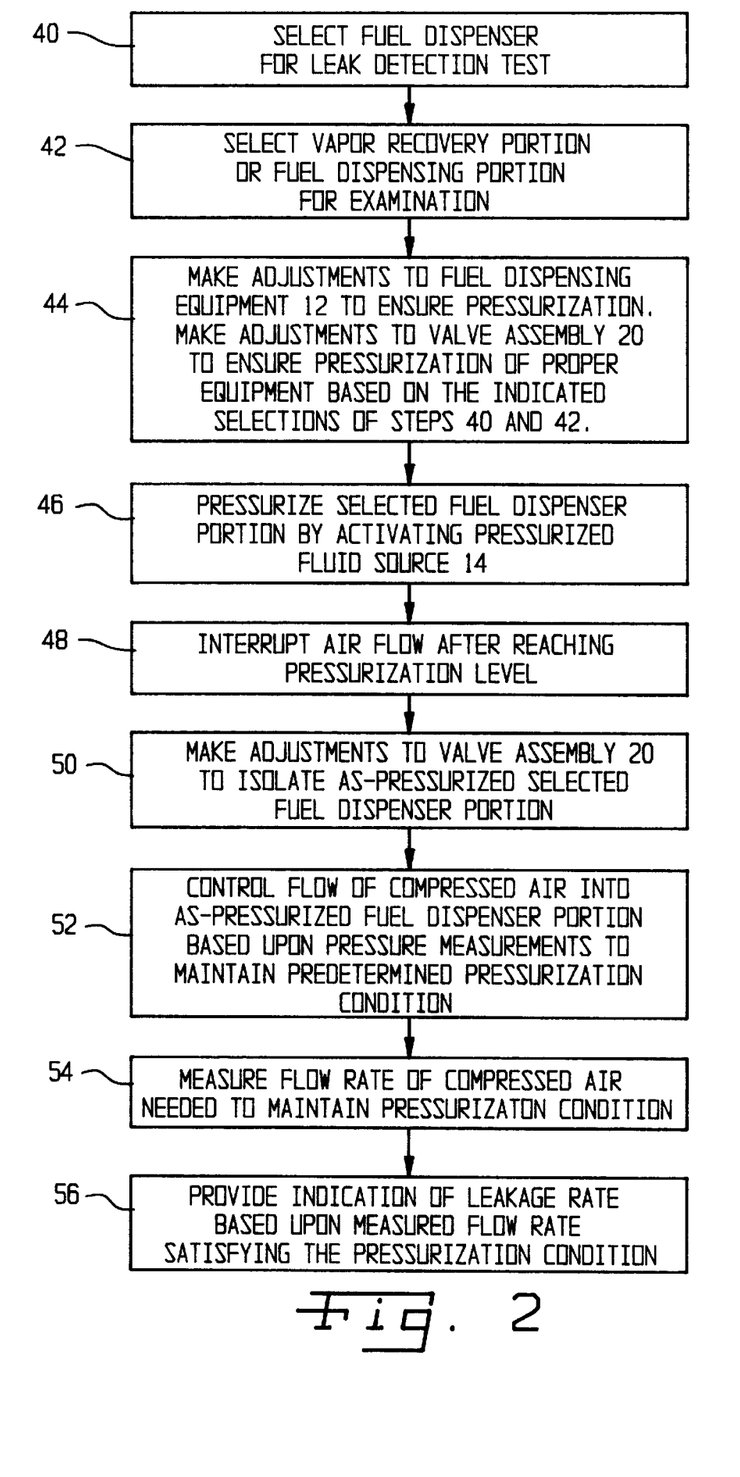
FIG. 2 is a flow diagram illustrating a sequence of steps for conducting a leak detection procedure in accordance with another embodiment of the present invention which utilizes the system of FIG. 1.

Referring now to FIG. 2, there is shown a flow diagram illustrating a sequence of steps for conducting a leak detection procedure according to another embodiment of the present invention and which preferably employs the leak detection system 10 of FIG. 1 to facilitate execution of the leak test. This procedure is preferably associated with a fuel delivery system including a plurality of individual fuel dispensers. An initial selection is made in step 40 to determine which one of the plural fuel dispensers will be designated for the leak detection test. An additional selection is made in step 42 to decide whether the vapor recovery portion or the liquid fuel dispensing portion of the particular fuel dispenser selected by step 40 will be subject to pressurization. Based upon the equipment selections made in steps 40 and 42, the proper adjustments are made to valve assembly 20 and fuel dispensing equipment 20 to ensure that the correct fuel dispenser apparatus is disposed for fluid communication with the pressurized fluid source 14 to enable its pressurization.

After the system set-up accomplished by steps 40-42-44, the pressurization activity commences in step 46 by activating the pressurized fluid source 14 to thereby generate compressed air flow 16 that is conveyed to the selected fuel dispenser portion. This initial pressurization activity is discontinued after the pressurization level reaches a certain threshold level (as sensed by pressure transducer 22) and remains there for a certain holding period. Discontinuing the initial pressurization is accomplished by interrupting the flow of compressed air to the fuel dispensing equipment as indicated by step 48. Adjustments are then made to valve assembly 20 to isolate the as-pressurized fuel dispenser portion so that an analysis can be undertaken to determine the leakage rate thereof (step 50). In particular, as set forth in step 52, a controlled flow of compressed air from fluid source 14 is provided to the as-pressurized fuel dispenser portion in accordance with the pressure measurements obtained from pressure transducer 22 to maintain a desired pressurization condition within the fuel dispenser portion. This pressurization condition, for example, may be represented by a predetermined target pressure level that is to be sustained throughout the test period. The flow rate of compressed air needed to maintain this pressurization condition is then measured according to step 54. Although flowmeter 18 may provide a continuous reading of the compressed air flow rate, it is preferable to allow the pressure level of the fuel dispenser portion to stabilize before identifying the particular flow rate measurement that is to be used as the basis for determining the leakage rate. The pressure values needed to assist controller 24 in controlling fluid source 14 and verifying the stabilization condition are provided by pressure transducer 22.

The flow rate measurement associated with the stabilized pressurization level is used by processor 32 to determine the leakage rate (step 56). This computed leakage rate is compared against an allowable leakage range to determine whether the fuel dispensing equipment should be disabled and/or placed out of service due to an unacceptable level of vapor release or fuel discharge, whichever is the case. One advantage of using compressed air or any other suitable gas as the testing medium relates to its non-volatility. Additionally, a gaseous test medium compares favorably to a liquid medium because of its ability to better penetrate and pass through smaller-dimensioned pores and other leak-producing weaknesses in the fuel dispenser, thereby providing an enhanced performance relative to the discovery and identification of leakage points.

Figure 3:
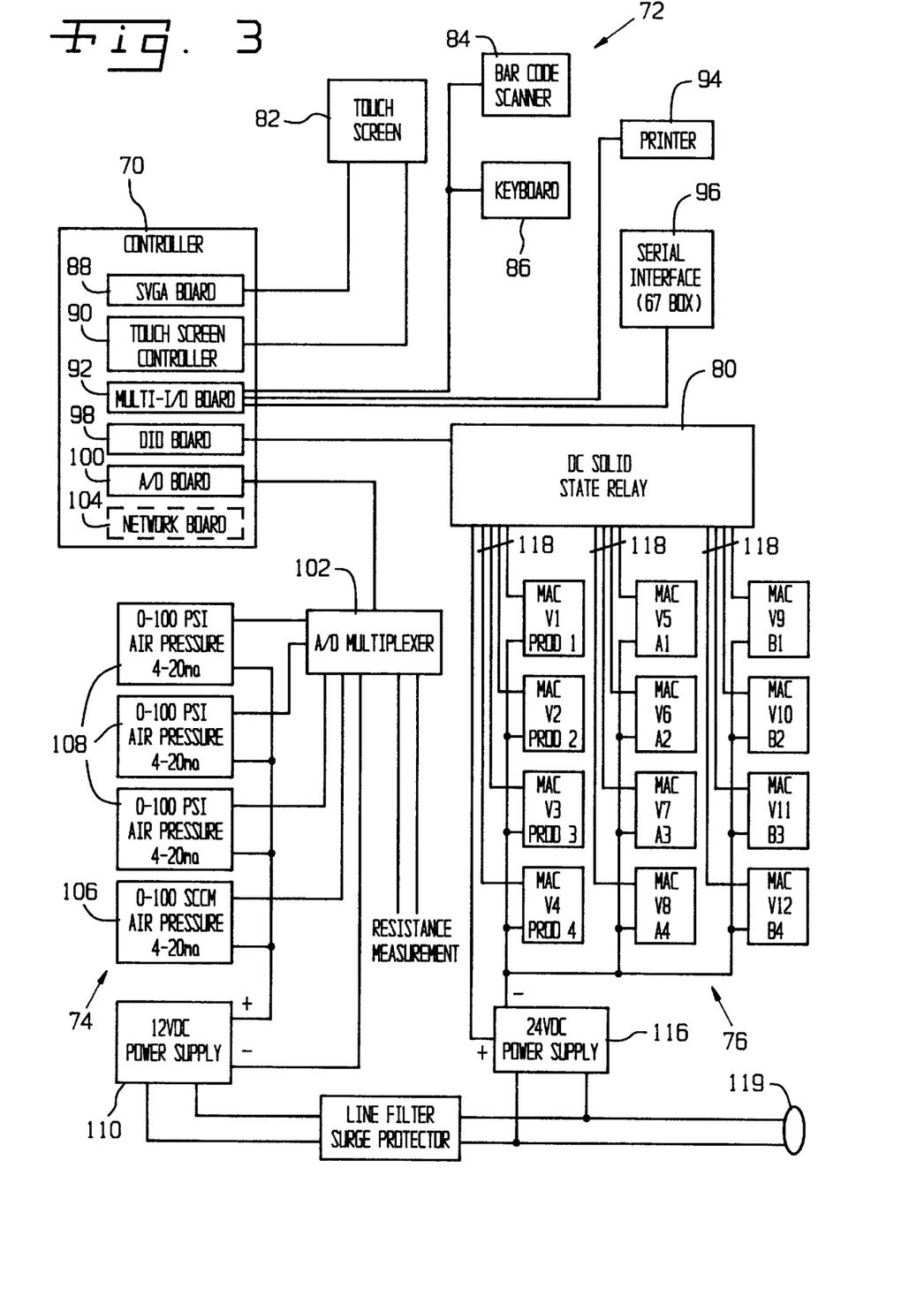
FIGS. 3 and 4 are detailed block diagrams together illustrating one implementation of the leak detection system of FIG. 1.
Figure 4:
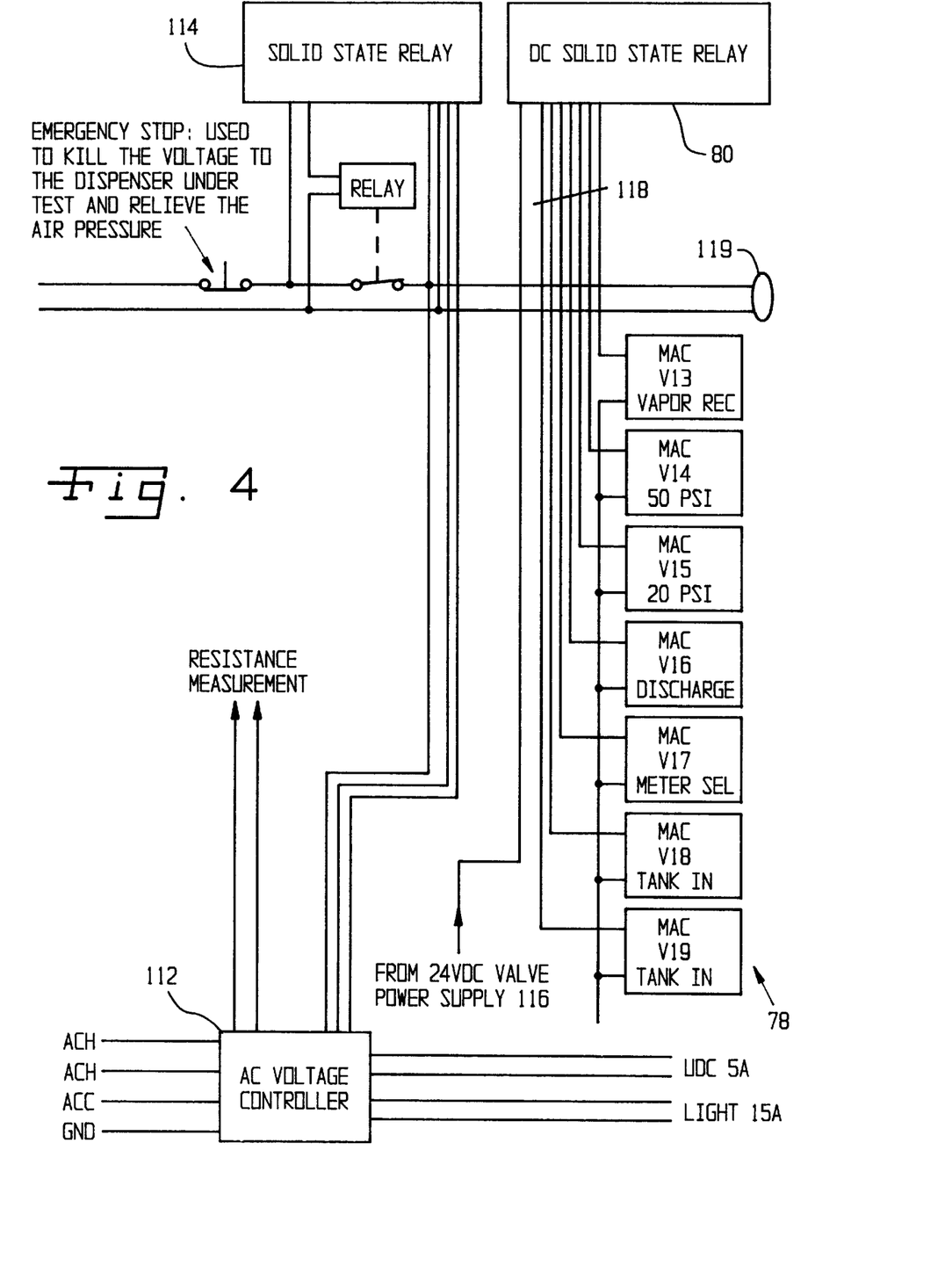
Figure 5:
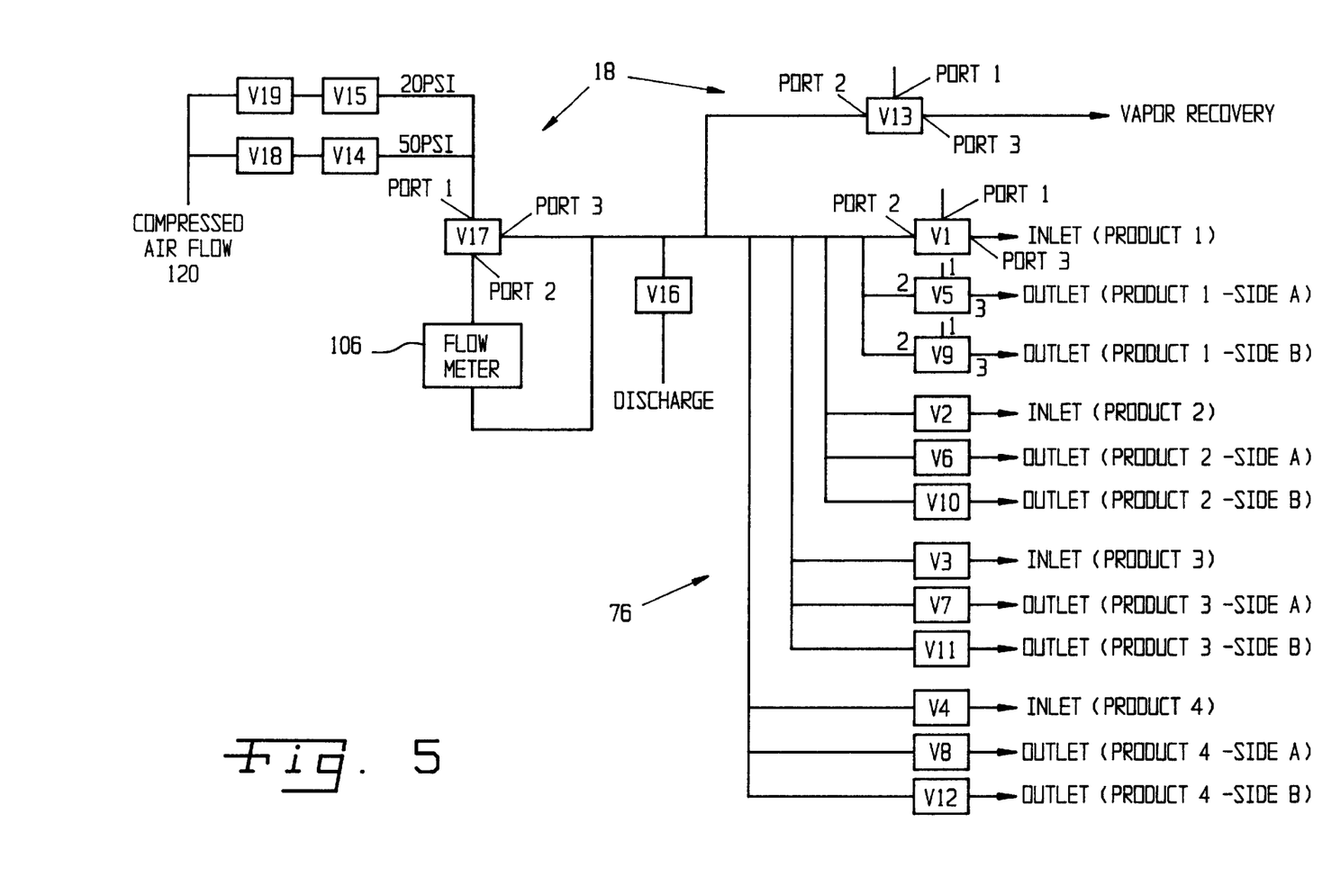
FIG. 5 is a block diagram illustration of the pneumatic apparatus including a valve assembly used in connection with the arrangement shown in FIGS. 3 and 4.

Referring now to FIGS. 3–5, there is shown a series of block diagrams illustrating one implementation of the leak detection system of FIG. 1. In particular, FIGS. 3 and 4 describe the hardware arrangement for the illustrated implementation and FIG. 5 shows the valve-based pneumatic apparatus used to establish fluid communication between the pressurized fluid source and the fuel dispensers under test. The illustrated implementation is shown for illustrative purposes only as it should be apparent to those skilled in the art that other component arrangements may be employed within the scope of the present invention. Furthermore, the illustrated implementation is configured for operation in association with a four product dispenser (e.g., four grades of fuel) each having a first and second side for independent fuel delivery, although any other fuel dispenser configuration may be integrally arranged with the leak detector system of the present invention.

Referring particularly to FIGS. 3 and 4, there is shown together by these drawings the arrangement of components for constructing one implementation of the leak detection system of the present invention. The illustrated component arrangement includes, inter alia, a main controller 70; a set of input modules 72 providing various types of operator interfaces to the system; an array of sensors 74 providing pressure and air flow measurements to controller 70; a first valve assembly 76 disposed on the fuel dispenser side for controllably regulating the flow of pressurized fluid (compressed air) to the liquid dispensing portions thereof; a second valve assembly 78 disposed on the fluid source side for controllably regulating the flow of pressurized fluid therefrom and for providing compressed air to the vapor recovery portion; and a DC solid state relay 80 for supplying the first valve assembly 76 and second valve assembly 78 with DC control signals from controller 70. The interconnection and arrangement of first valve assembly 76 and second valve assembly 78 is shown in the pneumatic apparatus illustrated in FIG. 5.

Referring to controller 70, the operator interacting with input modules 72 is alternatively provided with a touch screen 82, a bar code scanner 84, and a keyboard 86 for selectively communicating with controller 70 to initiate, control, and monitor the leak detection test. Controller 70 includes various subsystems for interacting with input modules 72 and other components of the leak detection system. For example, the illustrated controller 70 includes an SVGA video board 88 connected to touch screen 82; a touch screen controller 90 for controlling touch screen 82; and a multi-I/O board 92 communicating with bar code scanner 84 and keyboard 86. The illustrated multi-I/O board 92 also provides controller 70 with connectivity to printer 94 and a serial interface 96, which may serve to connect the system to other communication modules, networks, or devices. The illustrated controller 70 further includes a digital input/output (DIO) board 98 that supplies DC solid state relay 80 with control signals for controlling the relevant valve assemblies. An analog-to-digital (A/D) board 100 interfaces with A/D multiplexer 102, which receives the sensor signals provided by sensor array 74. An Ethernet network board 104 permits controller 70 to be configured for communication over an Ethernet line.

Controller 70 is preferably configured in the form of a microprocessor or other similar computing module. For example, controller 70 may be a 486DX2 computer running at 66 MHz with an MS-DOS operating system and having 8M of RAM that is located along with the other subsystems in a 10-slot industrial chassis. The DIO board 98 may use Computer Boards Inc. CIO-DIO192. The analog-to-digital conversion functions may be accomplished using Computer Boards Inc. CIO-DAS08-PGM, a MetraByte DAS-8PGA compatible board. This board has a 12-bit A/D converter that provides a resolution of $1/4096$ bits of full scale. The solid state relay 80, which is populated with DC output modules, is mounted on a solid state relay rack (e.g., a 24-position relay printed circuit board) and connected to the 192 digital I/O board 98 of controller 70 using a 50-pin ribbon cable. A resistance measurement is accomplished by using a positive DC voltage, a 1% resistor and an input to A/D multiplexer 102. This measurement will be used to check the DC resistance of the UDC AC and light AC (transformer and ballast resistance) prior to applying the AC voltage.

The illustrated sensor array 74 includes a flow meter 106 and a set of three pressure sensors 108. Flow meter 106 is suitably arranged in a conventional manner to establish operative fluid communication with the pressurized fluid source (not shown) to enable measurement of the flow rate of compressed air generated by the fluid source. Flow meter 106 is preferably provided in the form of a gas flow transducer that translates 0–100 SCCM to a 4–20 Ma proportional output representative of the measured flow rate. The transducer has four connections, namely positive and negative DC voltage inputs and positive and negative current outputs. The current outputs are connected to respective inputs of A/D multiplexer 102 for transmission to controller 70 for processing thereof. There is a 250 ohm 1% resistor across the positive and negative air flow transducer inputs to A/D multiplexer 102 to convert the air flow sensor signals (4–20 mA current) into a voltage reading. The pressure sensors 108 are suitably arranged in a conventional manner to permit the acquisition of pressure readings for the fuel dispenser equipment under test, namely the vapor recovery portions and liquid fuel dispensing portions thereof. Pressure sensors 108 are each preferably provided in the form of a pressure transducer that translates 0–100 psi gauge pressure to a 4–20 Ma proportional output representative of the pressure measurement. The transducer has two connections, namely a positive DC voltage and a current output which is connected to a positive input of A/D multiplexer 102. The negative side of a 12 VDC sensor power supply 110 is connected to a negative input of A/D multiplexer 102. There is a 250 ohm 1% resistor across the positive and negative pressure transducer input to A/D multiplexer 102 to convert the pressure sensor signals (4–20 mA) into a voltage reading.

An AC voltage controller 112 supplies controlled AC voltage to the UDC and a light matrix through a controllable AC solid state relay 114 that is populated with AC input and AC output modules. The AC solid state relay 114 and DC solid state relay 80 may be provided in the form of an integral unit.

AC controller 112 selects proper voltage to be applied to the dispenser. Through a series of relays the UDC can supply 120 VAL or 240 VAL. The AC controller 112 also selects the voltage on or off.

The illustrated first valve assembly 76 and second valve assembly 78 each comprise an arrangement of individual valve modules each preferably configured in the form of an air-actuated ball valve. Each valve configuration includes a ball valve with an air actuator mounted on it and pneumatically coupled using a mechanical connection. Ball valves are preferred because of their simple open and close characteristics. The inflow of air for the actuator is provided by a MAC solenoid, which is opened and closed by applying a 24 VDC to the solenoid coil. The MAC solenoid, in particular, includes electrical control inputs, a pneumatic input port adapted to receive a compressed air flow, and a pneumatic output port adapted to supply its associated actuator with the compressed air flow. The flow condition of the valve (i.e., open or close) depends upon the DC signals present on the solenoid control input lines. The valve control signals 118 represent DC inputs to the valves provided in accordance with power control signals from controller 70, which direct the routing by DC solid state relay 80 of the 24 VDC signal from power supply 116.

Referring now to FIG. 5, there is shown in block diagram format the arrangement of first valve assembly 76 and second valve assembly 78 together forming a pneumatic apparatus that selectively establishes fluid communication between a fluid source generating a flow of compressed air 120 and the fuel dispensing equipment. For the illustrated arrangement, the applicable testing procedure uses a 20 psi and a 50 psi pressurization level. Accordingly, a 20 psi line is provided having a valve arrangement that includes an input valve V19 and an output valve V15. Similarly, the 50 psi line includes an input valve V18 and an output valve V14. The output port of each 2-way output valve V14 and V15 is coupled to port 1 of 3-way high flow rate/bypass valve V17. Valve V17 is coupled at port 2 to the input of flow meter 106. The output of flow meter 106 is coupled to port 3 of valve V17. The 20 psi and 50 psi lines are used to initially pressurize the designated fuel dispenser portion to the indicated pressure level, while the flow path through flow meter 106 is used to resupply the fuel dispenser portion with a compressed air flow 120 sufficient to maintain the pressurized level. The flow rate of this resupplying compressed air flow is measured by flow meter 106 and represents the leakage rate. For the illustrated example in which the leak detection system is operatively associated with a service station having four 2-sided product dispensers, the illustrated valve arrangement is generally configured at its end interfaced with the liquid fuel dispenser such that one valve regulates the flow of compressed air into the dispenser inlet while a pair of valves each regulates the flow into the dispenser outlet associated with a respective side of the fuel dispenser. For example, regarding the fuel dispenser delivering the designated Product 1, valve V1 is connected to the inlet of the associated Product 1 fuel dispenser, valve V5 is connected to the outlet corresponding to side A of the associated fuel dispenser, and valve V9 is connected to the outlet corresponding to side B of the associated fuel dispenser. The inlet portion, for example, may correspond to the upstream segment of the fuel delivery system connecting the liquid fuel reservoir to the distribution point (i.e., where sides A and B branch out), while the outlet portion may correspond to the downstream segment of the fuel delivery system extending from the distribution point to the manually-activated discharge nozzle, which may include the length of flexible fuel delivery hose that is moved about by the refueling operator.

The inlet is the fluid connection from the liquid fuel reservoir to the dispenser. The outlet is the fluid connection from the dispenser to the device being fueled. The outlet normally has the hose and nozzle coupled to the dispenser.

In operation, the leak test procedure that governs the examination and investigation of the fuel dispensing equipment is preferably programmed into controller 70 using a software formulation or some other suitable format in order to provide an automated test sequence executed under the computerized activity of controller 70. As part of a preliminary set-up before executing the test sequence, it is necessary that the pneumatic apparatus be properly integrated with the fuel dispenser under test. For this purpose, the operator may use the bar code scanner 84 to read the serial number of the fuel dispenser, which is automatically supplied to controller 70. The computer employs a database to cross-reference the serial number with the components used to build the fuel dispenser. This information allows the operator to make the proper connections (i.e., electrical, mechanical, and pneumatic) to the fuel dispenser under test. The test sequence can be commenced after the leak detection system is operatively integrated with the designated fuel dispensing equipment.

The test procedure executed by controller 70 broadly includes the following sequence of functional steps. Controller 70 directs the pressurization activity associated with the fuel dispenser by appropriately controlling the operation of the pressurized fluid source and valve assemblies 76 and 78. The amount of compressed air traveling from the fluid source to the fuel dispenser is measured by air flow meter 106 to produce a signal representative of the compressed air flow rate. The measurement of interest provided by flow meter 106 corresponds to the flow rate needed to satisfy a pressurization condition associated with the fuel dispenser. This pressurization condition, for example, may relate to maintaining the induced pressurization level within the fuel dispenser above or within a predetermined threshold range. Since any reduction in air pressure from the initial pressurization level represents a loss due to leakage (provided that the fuel dispenser is sufficiently sealed and after taking into account an acceptable degree of pressure change), the amount of compressed air admitted (post-pressurization) into the fuel dispenser must indicate the amount escaping from the fuel dispenser. Once the pressurization condition is stabilized, which occurs when the pressurization level measured by pressure transducers 108 remains steady (thereby suggesting that the amount of escaping air is being substantially replaced by an incoming flow of compressed air), the reading taken from flow meter 106 that accompanies satisfactory achievement of the pressurization condition represents the leakage flow rate. If the leak rate is below the allowable value the fuel dispenser passes the leak test. Otherwise, the fuel dispenser is deemed to have an unacceptable amount of leakage and is given a failure rating. A report is printed with the test results. The fuel dispenser under test is de-pressurized so that another fuel dispenser can be examined. Controller 70 determines on which side the product is leaking and whether the leak is on the inlet or outlet side of the control valve. Controller 70 is provided with a processor or analyzer means to examine the data measurements from flow meter 106 and make the determination regarding the leakage rate and its acceptability relative to an allowable loss.

Controller 20 adjusts the fuel dispensing equipment 12 to isolate the inlet and outlet. Controller 20, more specifically, adjusts valve V5 and valve V9 to determine the source of the leak (V5 and V9 as stated). This adjustment is for product 1. Other products use their respective valves.

Referring now to Appendices A and B attached hereto and forming a part hereof, there is provided in Appendix A, a script file defining an initialization sequence for making a preliminary check of the leak detector system shown and described above in FIGS. 3–5. Appendix B sets forth a script file defining a test sequence for selectively performing a leak test on the vapor recovery portion of the dispenser and the liquid fuel dispensing portion of each one of the four fuel product dispensers. The script files serve as general guidelines and may be used as the basis for developing a command instruction set that is programmed into controller 70 as an execution file. The manner and form of programming may be of any conventional type. The script files are for illustrative purposes only and should not be considered in limitation of the present invention as it should be apparent to those skilled in the art that other instruction sequences may be developed to implement the leak detector test sequence. For the purpose of explaining the script files, the valve settings in the de-energized state are provided for the following valves: valves V1 through V13 (ports 1, 3)—discharge; valves V14 and V15 (normally open)—opened; valve V16 (normally open)—opened; valve V17 (ports 1, 3)—bypass/high flow meter; and valves V18 and V19 (normally closed)—closed. These default settings will allow air pressure to decrease (i.e., discharge to atmosphere) when the emergency switch is engaged.

Referring to Appendix A, the script file listed therein is run after the computer is initially powered on. The inflow of air generated by the pressurized fluid source is checked to verify that it can attain the proper pressure levels. The leak detection system is checked to make sure that the test operating pressures can be reached and that there are no leaks or malfunctioning components in the system. In general, the leak detection system is subject to a pre-operational maintenance survey to prepare it for executing the leak test procedure. Additionally, the pressure is maintained in the air supply tanks to minimize the charge time accompanying the actual testing of a fuel dispenser.

Referring to Appendix B, the listed script file sets forth the instructions for implementing the test procedure for both the vapor recovery portion and liquid fuel dispensing portion of the fuel dispensers. Each equipment model of fuel dispenser has associated with it a particular script file stored in a memory area of controller 70. Identification of a model serial number by the bar code scanner 84, for example, enables controller 70 to retrieve the correct script file and provide the operator with the proper instructions for connecting the leak detector system to the fuel dispenser. After the proper electrical and pneumatic connections are made, the main leak detector test sequence can begin using the retrieved script file.

Reference is now made to the instruction set encompassed by steps 20 through 40 in the Appendix B script file for describing an illustrative sequence of steps associated with the testing of the vapor recovery portion of the dispenser, with additional reference being made to the valve arrangement of FIG. 5. The discharge valve V16 is first closed. Valve V17 is configured for fluid communication between ports 1 and 3 thereof. The outlet valve V15 associated with the 20 psi line is opened. Valve V13, which is arranged for fluid communication at output port 3 thereof with the vapor recovery portion of the fuel dispenser, is activated to permit operational pressurization of the vapor recovery portion. After the inlet valve V19 associated with the 20 psi line is opened, the compressed air flow 120 follows a fluid transmission path through valves V19, V15, V17, and V13 to thereby pressurize the vapor recovery portion. Controller 70 controls the pressurization level of air flow 120 to make sure that it is supplied at 20 psi. Pressure transducers 108 monitor the pressurization level of the as-pressurized vapor recovery portion to ensure that the pressurizing activity is complete and accurately performed. After the initial pressurizing activity is completed, the 20 psi line is disabled by closing the inlet valve V19. A pressure-maintaining compressed air flow 120 is now provided to the vapor recovery portion along a fluid transmission path that passes through valve V17 at ports 1 and 2 thereof. Controller 70 actively controls the amount of this resupplying air flow in order to sustain the pressurization level of the vapor recovery portion in accordance with a test condition, i.e., one that involves maintaining the pressurization level at or above the original 20 psi mark. The flow rate of this resupplying compressed air flow is measured by flow meter 106, which as indicated is disposed in the fluid pathway. After the pressurization level of the vapor recovery portion is given ample time to stabilize, a flow rate reading is obtained from flow meter 106 to provide an indication of the leakage rate. At this point the test procedure is completed for the vapor recovery portion and the system is returned to its original pre-pressurizing state by suitably configuring valves V17, V15 (closed), V16 (opened to facilitate discharge), and V13 (ports 1, 3 connected for pressure discharge).

Reference is now made to the instruction set encompassed by steps 41 through 83 in the Appendix B script file for describing an illustrative sequence of steps associated with the testing of the liquid fuel dispensing portion of the product 1 fuel dispenser (sides A and B) at 20 psi and 50 psi. Valves V1, V5, and V9 are activated to establish fluid communication between their respective input and output flow ports (i.e., ports 2 and 3). As indicated, the inlet of the product 1 dispenser is pressurized through valve V1, while the outlets at sides A and B are each pressurized through respective valves V5 and V9. First the 20 psi line and then the 50 psi line are operated by properly activating the valve sets V19–V15 and V18–V14, respectively, along with controlling the compressed air flow 120 to generate the corresponding pressurized flow. For each of the 20 psi and 50 psi pressurization sequences, the pressurizing lines are closed after reaching the target pressurization level. Next, the flow rate needed to stably maintain the respective inlet/outlet liquid fuel dispensing portion at the testing pressure level (i.e., 20 psi or 50 psi) is measured by flow meter 106 to provide a representative indication of the leakage rate. Note that valves V1, V5, and V9 are commonly activated so that their respective segments (i.e., inlet/outlet) of the liquid fuel dispensing portion are concurrently pressurized. Alternatively, valves V1, V5 and V9 may be sequentially activated to serially pressurize the inlet/outlet segments and perform the leak test procedure in a discrete manner. After the leak test is finished, the valve settings are properly readjusted to relieve the pressure from the system. The leak detection test involving the fuel dispensers for the other products is executed in a similar manner.

The computerized leak detection system shown and described herein provides a fully automated and integrated testing platform, thereby eliminating multiple test stations (functional, leak, and vapor recovery) and the need for human interpretation of test requirements and results. Data may be accumulated in a database resident on controller 70 to create statistical information for root cause corrective action. The data may also be correlated to equipment serial numbers to allow for the matching of field problems to the proper fuel dispenser manufacturer. The leak tests can also be performed with a higher degree of efficiency and accuracy due to the fully automated implementation available with the computerized arrangement. Utilizing compressed air or some other suitable gaseous medium provides environmentally safe testing, avoiding the use of hazardous liquid materials present in conventional detection apparatus. Furthermore, the leak detection system is not model specific but may be configurable with any previous, existing or future equipment arrangement by simply incorporating the proper connection and interface means using any conventionally understood and appropriate technique.

The leak detector of the present invention can measure leak rate, flow rate, and other functional parameters of the dispenser, in particular, flow rates through each product, UDC current, light current, valve current, motor current, nozzle switches, encoders, keypads, displays, printers, card readers, cash acceptors, serial communications, speakers, output relays, set manager's mode data may be all monitored.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

APPENDIX A

Initialization Sequence

1. 'example of system test and initialization script file
2. '
3. 'test incoming air pressure
4. FailureMsg Incoming air pressure should be 75 to 85 PSI
5. TestPressure PT2>= 75 1'test the incoming air pressure to be greater than 75 PSI, wait 1 clock tick
6. EnergizeDCValve 14      'close ball valve 14,50 PSI outlet valve
7. EnergizeDCValve 15      'close ball valve 15,20 PSI inlet valve
8. '
9. 'test system leak rate at 20 PSI
10. EnergizeDCValve 16     'close ball valve 16
11. DeenergizeDcvalve 15   'open ball valve 15,20 PSI outlet valve
12. EnergizeDCValve 19     'open ball valve 19,10 PSI inlet valve
13. FailureMsg System test air pressure should be 20 PSI
14. TestPresure PT1>=20 540'test the pressure at PT1 until it is 'above 20 PSI for a maximum of 540 clock ticks (30 seconds)
15. DeenergizeDCValve 19   'close ball valve 19,20 PSI inlet valve
16. EnergizeDCValve 17     'ports 2,3 of V17, measure leak rate
17. DelayFor 3240          'delay for 3240 clock ticks (3 minutes) to 'allow system to stabilize
18. FailureMsg System leak rate @ 20 PSI should be −.2 to +.2 SCCM
19. TestAirFlow M1−.2 .2   'air flow should be between −.2 and +.2 'SCCM

APPENDIX A-continued

Initialization Sequence

20. EnergizeDCValve 15     'close ball valve 1,20 PSI outlet valve
21. DeenergizeDCValve 17   'ports 1,3 of V17, high flow rate/bypass
22. '
23. 'test system leak rate at 50 PSI
24. DeenergizeDCValve 14   'open ball valve 14,50 PSI outlet valve
25. EnergizeDCValve 18     'open ball valve 18,50 PSI inlet valve
26. FailureMsg System test air pressure should be 50 PSI
27. TestPressure PTI>=50 540'test the pressure at PT1 until it is 'above 50 PSI for a maximum of 540 clock ticks (30 seconds)
28. DeenergizeDCValve 18   'close ball valve 18,50 PSI inlet valve
29. EnergizeDCValve 17     'ports 2,3 of V17, measure leak rate
30. DelayFor 3240         'delay for 3240 clock ticks (3 minutes) to 'allow system to stabilize
31. FailureMsg System leak rate @ 50 PSI should be −.2 to +.2 SCCM
32. TestAirFlow M1 −.2 .2   'air flow should be between −.2 and +.2 'SCCM
33. EnergizeDCValve 14     'close ball valve 14,50 PSI outlet valve
34. DeenergizeDCValve 17   'ports 1,3 of V17, high flow rate/bypass
35. DeenergizeDCValve 16   'discharge air pressure
36. TestPressure PT1<=1 540'make sure the system is de-pressurized
37. 'system test complete

APPENDIX B

Test Sequence

1. 'example of 428 test script file
2. '
3. The computer will prompt the operator to make the appropriate
4. electrical, pneumatic connections and turn switches
5. 'make sure the DC resistance is correct for the selected voltage
6. FailureMsg UDC AC circuit DC resistance incorrect
7. TestResistance R1 100 150'measure the DC resistance 'of the UDC AC circuit
8. EnergizeACRelay 5     'switch K5 to connect light AC circuit
9. TestResistance R1 50 75 'measure the DC resistance of the light AC circuit
10. DeenergizeACRelay 5   'switch K5 back to UDC AC circuit
11. '
12. 'set the AC voltage to 110V for both the UDC and lights
13. DeenergizeACRelay 1   'switch K1 for 110V UDC voltage
14. DeenergizeACRelay 2   'switch K2 for 110V light voltage
15. '
16. 'turn on the AC voltages
17. EnergizeACRelay 3     'turn on UDC voltage
18. EnergizeACRelay 4     'turn on light voltage
19. '
20. 'TEST THE VAPOR RECOVERY PORTION OF THE DISPENSER
21. EnergizeDCValve 16     'close ball valve V16
22. DeenergizeDCValve 17   'ports 1,3 of V17, high flow rate/bypass
23. DeenergizeDCValve 15   'open ball valve V15,20 PSI outlet valve
24. EnergizeDCValve 13     'ports 2,3 of ball valve V13, charge the 'vapor recovery of the dispenser.
25. EnergizeDCValve 19     'open V19
26. FailureMsg Vapor recovery pressure should be 20 PSI
27. TestPressure PT1>=20 540'test the pressure at PT1 until it is 'above 20 PSI for a maximum of 540 clock ticks (30 seconds)
28. DeenergizeDCValve 19   'close ball valve V19
29. EnergizeDCValve 17     'ports 2,3 of ball valve V17, measure 'leak rate
30. DelayFor 3240         'wait for 3240 clock ticks (3 minutes) 'to allow air pressure to stabilize
31. FailureMsg Vapor recovery leak rate @ 20 PSI should be <5.0 SCCM
32. TestAirFlow M1 −.2 5.0 'air flow should be between '−.2 and +5.0 SCCM
33. DeenergizeDCvalve 17   'ports 1,3 of ball valve V17, high flow 'rate/bypass
34. EnergizeDCValve 16     'close V15,20 PSI outlet valve
35. DeenergizeDCValve 16   'open ball valve V16, discharge
36. FailureMSG Vapor recovery pressure should drop to <1 PSI
37. TestPressure PT1#=1 540'wait for a maximum of 540 clock ticks (30 seconds) for the pressure to drop to less than 1 PSI

APPENDIX B-continued

Test Sequence

38. DeenergizeDCValve 13   'ports 1,3 of ball valve V13, discharge 'the vapor recovery
39. 'THE VAPOR RECOVERY PASSED THE LEAK TEST @ 20 PSI
40. '
41. 'TEST THE LIQUID PORTION OF THE DISPENSER @ 20 PSI
42. the computer Will activate the dispenser's manager mode via serial communications
43. EnergizeDCValve 16     close ball valve V16
44. DeenergizeDCValve 17   'ports 1,3 of bali valve V17, high flow 'rate/bypass
45. '
46. 'product 1 leak test @ 20 PSI
47. EnergizeDCValve 20     'close ball valve V20
48. DeenergizeDCValve 15   'open ball valve V15,20 PSI outlet valve
49. EnergizeDCValve 1       'ports 2,3 of ball valve V1, charge 'product 1 inlet
50. the computer will open the low flow and high flow valves of side A product 1
51. the computer will open the low flow and high flow valves of side B product 1
52. EnergizeDCValve 5       'ports 2,3 of ball V5, charge side A 'product 1 outlet
53. EnergizeDCValve 9       'ports 2,3 of ball V9, charge side B 'product 1 outlet
54. EnergizeDCValve 19     'open ball valve V19,20 PSI inlet valve
55. FailureMsg Product 1 pressure should be 20 PSJ
56. TestPressure PT1>=20 540 'test the pressure at PT1 until it is 'above 20 PSI for a maximum of 540 clock ticks (30 seconds)
57. DeenergizeDCValve 19   'close ball valve V19
58. EnergizeDCValve 17     'ports 2,3 of ball valve V17, measure 'leak rate
59. DelayFor 3240         'wait for 3240 clock ticks (3 minutes) 'to allow air pressure to stabilize
60. FailureMsg Product 1 leak rate @ 20 PSI should be <5.0 SCCM
61. TestAirFlow M1 −.2 5.0 'air flow should be between −.2 and +5.0
62. DeenergizeDCvAlve 17   'ports 1,3 of ball valve V17, high flow 'rate/bypass
63. EnergizeDCValve 15     'close ball valve V15,20 PSI outlet 'valve
64. '
65. 'product 1 leak test @ 50 PSI
66. DeenergizeDCValve 14   'open ball valve 14,50 PSI outlet valve
67. EnergizeDCValve 18     'open ball valve V18,50 PSI inlet valve
68. FailureMsg Product 1 pressure should be 50 PSI
69. TestPressure PT1>=50 540 'test the pressure at PT1 until it is 'above 50 PSI for a maximum of 540 clock ticks (30 seconds)
70. DeenergizeDCValve 18   'close ball valve V18
71. EnergizeDCValve 17     'ports 2,3 of ball valve V17, measure 'leak rate
72. DelayFor 3240         'wait for 3240 clock ticks (3 minutes) 'to allow air pressure to stabilize
73. FailureMsg Product 1 leak rate @ 50 PSI should be <5.0 SCCM
74. TestAirFlow M1 −.2 5.0 'air flow should be between −.2 'and +5.0 SCCM
75. the computer will close the low flow and high flow valves of side A product 1
76. the computer will close the low flow and high flow valves of side B product 1
77. DeenergizeDCValve 1     'ports 1,3 of ball valve V1, discharge 'product 1 inlet
78. DeenergizeDCValve 5     'ports 1,3 of ball valve V5, discharge 'side A product 1 outlet
79. DeenergizeDCValve 9     'ports 1,3 of ball valve V9, discharge 'side B product 1 outlet
80. DeenergizeDCValve 16   'open ball valve 16, discharge to 'atmosphere
81. FailureMsg
82. TestPressure PT1<=10 540 'wait for a maximum of 540 clock ticks (30 seconds) for the pressure to drop below 10 PSI
83. EnergizeDCValve 16
84. '
85. 'product 2 leak test @ 20 PSI
86. DeenergizeDCValve 15   'open ball valve V15,20 PSI outlet valve

APPENDIX B-continued

Test Sequence

87. EnergizeDCValve 2    'ports 2,3 of ball valve V2, charge 'product 2 inlet
88. the computer will open the low flow and high flow valves of side A product 2
89. the computer will open the low flow and high flow valves of side B product 2
90. EnergizeDCValve 6    'ports 2,3 of ball valve V6, charge side 'A product 2 outlet
91. EnergizeDCValve 10    'ports 2,3 of ball valve V10, charge 'side B product 2
92. EnergizeDCValve 19    'open ball valve V19,20 PSI inlet valve
93. FailureMsg Product 2 pressure should be 20 PSI
94. Test Pressure PT1>=20 540'test the pressure at PT1 until it is 'above 20 PSI for a maximum of 540 clock ticks (30 seconds)
95. DeenergizeDCValve 19    'close ball valve V19
96. EnergizeDCValve 17    'ports 2,3 of ball valve V17, 'measure leak rate
97. DelayFor 3240    'wait for 3240 clock ticks (3 minutes) 'to allow air pressure to stabilize
98. FailureMsg Product 2 leak rate @ 20 PSI should be <5.0 SCCM
99. TestAirFlow M1 −.2 5.0 'air flow should be between −.2 'and +5.0 SCCM
100. DeenergizeDCValve 17    'ports 1,3 of ball valve V17, high flow 'rate/bypass
101. EnergizeDavalve 15    'close ball valve V15,20 PSI outlet 'valve
102. '
103. 'product 2 leak test @ 50 PSI
104. DeenergizeDCValve 14    'open ball valve 14,50 PSI outlet valve
105. EnergizeDCValve 18    'open ball valve V18,50 PSI inlet valve
106. FailureMsg Product 2 pressure should be 50 PSI
107. Test Pressure PT1>=50 540'test the pressure at PT1 until it is 'above 50 PSI for a maximum of 540 clock ticks (30 seconds)
108. DeenergizeDCValve 18    'close ball valve V18
109. EnergizeDCValve 17    'ports 2,3 of ball valve V17, measure 'leak rate
110. DelayFor 3240    'wait for 3240 clock ticks (3 minutes) 'to allow air pressure to stabilize
111. FailureMsg Product 2 leak rate @ 50 PSI should be <5.0 SCCM
112. TestAirFlow M1 −.2 5.0 'air flow should be between '−.2 and +5.0 SCCM
113. the computer will close the low flow and high flow valves of side A product 2
114. the computer will close the low flow and high flow valves of side B product 2
115. DeenergizeDCValve 2    'ports 2,3 of ball valve V2, discharge 'product 2 inlet
116. DeenergizeDCValve 6    'ports 2,3 of ball valve V6, discharge 'side A product 2 outlet
117. DeenergizeDCValve 10    'ports 1,3 of ball valve V10, discharge 'side B product 2 outlet
118. DeenergizeDCValve 16    'open ball valve 16, discharge to 'atmosphere
119. FailureMsg
120. Test Pressure PT1<=10 540'wait for a maximum of 540 clock ticks '(30 seconds) for the pressure to drop below 10 PSI
121. EnergizeDCValve 16
122. '
123. 'product 2 leak test @ 20 PSI
124. DeenergizeDCValve 15    'open ball valve V15,20 PSI outlet valve
125. EnergizeDCValve 3    'ports 2,3 of ball valve V3, charge 'product 3 inlet
126. the computer will open the low flow and high flow valves of side A product 3
127. the computer will open the low flow and high flow valves of side B product 3
128. EnergizeDCValve 7    'ports 2,3 of ball valve V7, charge side 'A product 3 outlet
129. EnergizeDCValve 11    'ports 2,3 of ball valve V11, charge 'side B product 3 outlet
130. EnergizeDCValve 19    'open ball valve V19,20 PSI inlet valve
131. FailureMsg Product 3 pressure should be 20 PSI
132. Test Pressure PT1>=20 540'test the pressure at PT1 until it is 'above 20 PSI for a maximum of 540 clock ticks (30 seconds)
133. DeenergizeDCValve 19    'close ball valve V19
134. EnergizeDCValve 19    'ports 2,3 of ball valve V17, measure 'leak rate
135. DelayFor 3240    'wait for 3240 clock ticks (3 minutes) to allow air pressure to stabilize
136. FailureMsg Product 3 leak rate @ 20 PSI should be <5.0 SCCM
137. TestAirFlow M1 −.2 5.0 'air flow should be between '−.2 and +5.0 SCCM
138. DeenergizeDCValve 17    'ports 1,3 of ball valve V17, high flow 'rate/bypass
139. EnergizeDCValve 15    'close ball valve V15,20 PSI outlet valve
140. '
141. 'product 3 leak test @ 50 PSI
142. DeenergizeDCValve 14    'open ball valve 14,50 PSI outlet valve
143. EnergizeDCValve 18    'open ball valve V18,50 PSI inlet valve
144. FailureMsg Product 3 pressure should be 50 PSI
145. Test Pressure PT1>=50 540'test the pressure at PT1 until it is 'above 50 PSI for a maximum of 540 clock ticks (30 seconds)
146. DeenergizeDCValve 18    'close ball valve V18
147. EnergizeDCValve 17    'ports 2,3 of ball valve V17, measure 'leak rate
148. DelayFor 3240    'wait for 3240 clock ticks (3 minutes) 'to allow air pressure to stabilize
149. FailureMsg Product 3 leak rate @ 50 PSI should be <5.0 SCCM
150. TestAirFlow M1 −.2 5.0 'air flow should be between −.2 and +5. 'SCCM
151. the computer will close the low flow and high flow valves of side A product 3
152. the computer will close the low flow and high flow valves of side B product 3
153. DeenergizeDCValve 3    'ports 1,3 of ball valve V3, discharge 'product 3 inlet
154. DeenergizeDCValve 7    'ports 1,3 of ball valve V7, discharge 'side A product 3 outlet
155. DeenergizeDCValve 11    'ports 1,3 of ball valve V11, discharge 'side B product 3 outlet
156. DeenergizeDCValve 16    'open ball valve 16, discharge to 'atmosphere
157. FailureMsg
158. Test Pressure PT1<=10 540'wait for a maximum of 540 clock ticks '(30 seconds) for the pressure to drop below 10 PSI
159. EnergizeDCValve 16
160. '
161. 'product 4 leak test @ 20 PSI
162. DeenergizeDCValve 15    'open ball valve V15,20 PSI outlet valve
163. EnergizeDCValve 4    'ports 2,3 of ball valve V4, charge 'product 4 inlet
164. the computer will open the low flow and high flow valves of side A product 4
165. the computer will open the low flow and high flow valves of side B product 4
166. EnergizeDCVAlve 8    'ports 2,3 of ball valve V6, charge side 'A product 4 outlet
167. EnergizeDcvAlve 12    'ports 2,3 of ball valve V12, charge 'side B product 4 outlet
168. EnergizeDCValve 19    'open ball valve V19,20 PSI inlet valve
169. FailureMsg Product 4 pressure should be 20 PSI
170. Test Pressure PT1>=20 540'test the pressure at PT1 until it is 'above 20 PSI for a maximum of 540 clock ticks (30 seconds)
171. DeenergizeDCValve 19    'close ball valve V19
172. EnergizeDCValve 17    'ports 2,3 of ball valve V17, measure 'leak rate
173. DelayFor 3240    'wait for 3240 clock ticks (3 minutes) 'to allow air pressure to stabilize
174. FailureMsg Product 4 leak rate @ 20 PSI should be <5.0 SCCM
175. TestAirFlow M1 −.2 5.0 'air flow should be between '−.2 and +5.0 SCCM
176. DeenergizeDCValve 17    'ports 1,3 of ball valve V18, high flow 'rate/bypass
177. EnergizeDCValve 15    'close ball valve V15,20 PSI outlet 'valve
178. '
179. 'product 4 leak test @ 50 PSI
180. DeenergizeDCValve 14    'open ball valve 14,50 PSI outlet valve
181. EnergizeDCValve 18    'open ball valve V18,50 PSI inlet valve
182. FailureMsg Product 4 pressure should be 50 PSI

APPENDIX B-continued

Test Sequence

183. Test Pressure PT1>=50 540 'test the pressure at PT1 until it is above 50 PSI for a maximum of 540 clock ticks (30 seconds)
184. DeenergizeDCValve 18    'close ball valve V18
185. EnergizeDavalve 17    'ports 2,3 of ball valve V17, measure 'leak rate
186. DelayFor 3240    'wait for 3240 clock ticks (3 minutes) 'to allow air pressure to stabilize
187. FailureMsg Product 4 leak rate @ 50 PSI should be <5.0 SCCM
188. TestAirFlow M1 −.2 5.0    'air flow should be between '−.2 and +5.0 SCCM
189. the computer will close the low flow and high flow valves of side A product 4
190. the computer will close the 10W flow and high flow valves of side B product 4
191. DeenergizeDCValve 4    'ports 1,3 of ball valve V4, discharge 'product 4 inlet
192. DeenergizeDCValve 8    'ports 1,3 of ball valve V8, discharge 'side A product 4 outlet
193. DeenergizeDCValve 12    'ports 1,3 of ball valve V12, discharge 'side B product 4 outlet
194. DeenergizeDCValve 16    'open ball valve 16, discharge
195. FailureMsg
196. Test Pressure PT1<=1 540 ttest the pressure at PT1 until it is 'below 1 PSI for a maximum of 540 clock ticks (30 seconds)
197. 'THE DISPENSER PASSES THE LEAK TEST
198. '
199. 'turn off the AC voltages
200. DeenergizeAcRelay 3    'turn off UDC voltage
201. DeenergizeACRelay 4    'turn off light voltage
202. The computer will generate a report indicating the results of the test.
203. The computer will prompt the operator to disconnect the appropriate electrical and pneumatic connections

What is claimed is:

1. A leak detection system for use with a fuel dispenser, said leak detection system comprising:

pressurization means for pneumatically pressurizing at least a portion of said fuel dispenser;

control means for controlling the pneumatic pressurization activity of said pressurization means;

measurement means for measuring the pneumatic flow rate associated with said pressurization means; and processor means for providing an indication of the leakage condition of said at least a portion of said fuel dispenser based upon the pneumatic flow rate measured by said measurement means which satisfies a pressurization condition for said fuel dispenser, said pressurization means operable to controllably pneumatically pressurize at least one of a vapor recovery portion and a liquid fuel dispensing portion of said fuel dispenser.

2. The leak detection system as recited in claim 1, wherein said control means further comprises:

a pressure sensor adjustably arranged in pneumatic pressure-detecting relationship with said at least a portion of said fuel dispenser; and means for generating a control signal representative of the pneumatic pressure detected by said pressure sensor and providing the control signal to said fluid source means to effect control thereof.

3. The leak detection system as recited in claim 1, wherein said pressurization means further comprises:

a controllable valve assembly arranged with said fluid source means and responsive to valve control signals supplied by said control means to controllably regulate the flow of pressurized fluid generated by said fluid source means and communicated to said at least a portion of said fuel dispenser.

4. The leak detection system as recited in claim 1, wherein said measurement means further comprises:

a fluid flow sensor adjustably arranged in flow rate-detecting relationship with the pressurized fluid generated by said fluid source means; and means for generating a control signal representative of the fluid flow rate detected by said fluid flow sensor and providing the control signal to said processor means.

5. The leak detection system as recited in claim 1, wherein the pressurization condition for said fuel dispenser associated with the functional activity of said processor means involves, at least in part, maintaining the pressurization level of said at least a portion of said fuel dispenser above a threshold value.

6. A leak detection system for use with a fuel dispenser, said leak detection system comprising:

a fluid source controllably providing a pressurized fluid flow and operatively arranged for fluid communication with at least a portion of said fuel dispenser to enable the pressurization thereof;

control means, operatively coupled to said fluid source, for controlling the pressurization of said at least a portion of said fuel dispenser;

first means for determining the flow rate of the pressurized fluid flow provided by said fluid source; and processor means for providing an indication of the leakage condition of said at least a portion of said fuel dispenser based upon the flow rate determined by said first means which satisfies a pressurization condition for said fuel dispenser, said fluid source operable to controllably pneumatically pressurize at least one of a vapor recovery portion and a liquid dispensing portion of said fuel dispenser.

7. The leak detection system as recited in claim 6, wherein the pressurization condition for said fuel dispenser associated with the functional activity of said processor means involves, at least in part, maintaining the pressurization level of said at least a portion of said fuel dispenser above a threshold value.

8. The leak detection system as recited in claim 6, further comprises:

valve means, arranged for control by said control means, for operatively regulating the flow of pressurized fluid from said fluid source to a selected one of said vapor recovery portion and said liquid dispensing portion of said fuel dispenser.

9. The leak detection system as recited in claim 6, wherein said control means further comprises:

a computing device.

10. A system for use with a fuel dispenser, said system comprising:

pressurization means for controllably pressurizing at least a portion of said fuel dispenser using a pressurized pneumatic fluid flow;

control means for controlling the pressurization activity of said pressurization means;

means for determining the leakage rate of said at least a portion of said fuel dispenser by measuring the flow rate of the pressurized pneumatic fluid flow which satisfies a pressurization condition for said fuel dispenser; and said pressurization means further comprising a means including a controllable valve assembly, for selectively operatively communicate the pressurized pneumatic fluid flow provided by said pressurization means to at least one of a vapor recovery portion and a liquid dispensing portion of said fuel dispenser.

11. The system as recited in claim 6, wherein the pressurization condition for said fuel dispenser associated with the functional activity of said leakage rate determining means involves, at least in part, maintaining the pressurization level of said at least a portion of said fuel dispenser above a threshold value.

12. The system as recited in claim 6, wherein said leakage rate determining means further comprises:
  a sensor arranged to detect the flow rate of the pressurized pneumatic fluid flow provided by said pressurization means and communicated to said at least a portion of said fuel dispenser; and
  a processor to provide an indication of the leakage rate of said at least a portion of said fuel dispenser based upon the measured flow rate associated with the satisfaction of said pressurization condition.

13. An assembly operatively associated with a fuel dispenser, said assembly comprising:
  a fluid source controllably providing a pressurized pneumatic fluid flow;
  a coupling assembly, including a controllable valve assembly, arranged to enable fluid communication between said fluid source and at least a portion of said fuel dispenser;
  a sensor arranged to detect the flow rate of pressurized fluid provided by said fluid source;
  a controller, arranged for operative control of said fluid source and said valve assembly, to control the pressurization of said at least a portion of said fuel dispenser; and
  a processor to determine a leakage condition of said at least a portion of said fuel dispenser based upon the detected flow rate of pressurized fluid which satisfies a pressurization condition for said fuel dispenser, said coupling assembly operatively arranged to permit the pressurized fluid flow provided by said fluid source to selectively communicate with at least one of a vapor recovery portion and a liquid dispensing portion of said fuel dispenser.

14. The assembly as recited in claim 13, wherein the pressurization condition for said fuel dispenser associated with the functional activity of said processor involves, at least in part, maintaining the pressurization level of said at least a portion of said fuel dispenser above a threshold value.

15. A leak detection method for use with a plurality of fuel dispensers, said method comprising the steps of:
  pneumatically pressurizing a selectable one of a vapor recovery portion and a fuel dispensing portion of at least one of said plurality of fuel dispensers;
  controlling the pneumatic pressurization of the selectable one of said vapor recovery portion and said fuel dispensing portion of said at least one fuel dispenser;
  measuring the flow rate of the pneumatic fluid flow associated with the pneumatic pressurization activity; and
  providing an indication of the leakage condition of the selectable one of said vapor recovery portion and said fuel dispensing portion of said at least one fuel dispenser based upon the measured pneumatic fluid flow rate which satisfies a pressurization condition for said fuel dispenser.

16. The leak detection system as recited in claim 15, wherein said pressurization means further comprises:

a fluid source controllably providing a pressurized fluid flow; and
  coupling means, arranged for control by said control means and including a controllable valve assembly, for operatively establishing fluid communication between said fluid source and the at least one of said plurality of fuel dispensers.

17. The leak detection system as recited in claim 16, wherein said coupling means is operable to permit the pressurized fluid flow provided by said fluid source to communicate with at least one of a vapor recovery portion and a liquid dispensing portion of the at least one of said plurality of fuel dispensers.

18. The leak detection system as recited in claim 17, wherein the pressurization condition for said at least one fuel dispenser associated with the functional activity of said processor means involves, at least in part, maintaining the pressurization level of said at least one fuel dispenser above a threshold value.

19. A leak detection method for use with a fuel dispenser, said method comprising the steps of:
  pneumatically pressurizing a selectable one of a vapor recovery portion and a fuel dispensing portion of said fuel dispenser;
  controlling the pneumatic pressurization of the selectable one of said vapor recovery portion and said fuel dispensing portion of said fuel dispenser in accordance with leak test criteria;
  measuring the flow rate of the pneumatic fluid flow associated with the pneumatic pressurization activity; and
  providing an indication of the leakage condition of the selectable one of said vapor recovery portion and said fuel dispensing portion of said fuel dispenser based upon the measured pneumatic fluid flow rate which satisfies a pressurization condition for said fuel dispenser.

20. The leak detection method as recited in claim 19, wherein the pressurization condition for said fuel dispenser associated with the step of providing an indication of the leak condition thereof involves, at least in part, maintaining the pressurization level of the selectable one of said vapor recovery portion and said fuel dispensing portion above a threshold value.

21. A leak detection method for use with a fuel dispenser, said method comprising the steps of:
  providing a fluid source controllably supplying a pressurized pneumatic fluid flow;
  disposing said fluid source in an arrangement enabling operative fluid communication between said fluid source and a selectable one of a vapor recovery portion and a fuel dispensing portion of said fuel dispenser to permit controllable pressurization thereof;
  providing a sensor to detect the flow rate of pressurized pneumatic fluid supplied by said fluid source;
  providing a controller to control the pressurization of the selectable one of said vapor recovery portion and said fuel dispensing portion of said fuel dispenser; and
  providing an indication of the leakage condition of the selectable one of said vapor recovery portion and said fuel dispensing portion of the fuel dispenser based upon the flow rate detected by said sensor which satisfies a pressurization condition for said fuel dispenser.

22. The leak detection method as recited in claim 21, wherein the pressurization condition for said fuel dispenser associated with the step of providing an indication of the leak condition thereof involves, at least in part, maintaining the pressurization level of the selectable one of said vapor recovery portion and said fuel dispensing portion above a threshold value.

23. The leak detection method as recited in claim 21, wherein the step of disposing said fluid source in the fluid communicative arrangement further comprises the steps of:

providing a controllable valve assembly arranged to regulate the flow of pressurized pneumatic fluid between said fluid source and the selectable one of said vapor recovery portion and said fuel dispensing portion of said fuel dispenser.

* * * * *